United States Patent [19]

Shaver et al.

[11] Patent Number: 4,964,075
[45] Date of Patent: Oct. 16, 1990

[54] SOFTWARE AND HARDWARE INDEPENDENT AUXILIARY USER PROGRAMMABLE INTELLIGENT KEYBOARD

[75] Inventors: Paul J. Shaver, Scotia; Patrick Madden, Smithtown; Allan Michasiow, Troy, all of N.Y.

[73] Assignee: A. J. Weiner, Inc., Randolph, Mass.

[21] Appl. No.: 420,608

[22] Filed: Oct. 6, 1989

Related U.S. Application Data

[63] Continuation of Ser. No. 47,695, May 8, 1987, abandoned.

[51] Int. Cl.⁵ ............................ G06F 3/02; G06C 7/02
[52] U.S. Cl. ..................................... 364/900; 235/146; 344/23; 364/928; 364/949
[58] Field of Search ............. 364/200, 900, 709.01, 364/709.1, 702.14, 709.15; 235/146; 341/23

[56] References Cited

U.S. PATENT DOCUMENTS

| | | | |
|---|---|---|---|
| 4,145,742 | 3/1979 | Olander et al. | 364/709 |
| 4,156,928 | 5/1979 | Inose et al. | 364/900 |
| 4,200,913 | 4/1980 | Kuhar et al. | 364/900 |
| 4,455,618 | 6/1984 | Walden et al. | 364/900 |
| 4,564,751 | 1/1986 | Alley et al. | 235/146 |
| 4,595,804 | 6/1986 | MacConnell | 235/146 X |
| 4,654,818 | 3/1987 | Wetterau | 364/900 |
| 4,722,065 | 1/1988 | Ogawa | 364/709 |
| 4,763,252 | 8/1988 | Rose | 364/200 |
| 4,779,079 | 10/1988 | Hauck | 364/900 X |

Primary Examiner—Raulfe B. Zache

[57] ABSTRACT

This device is an add-on accessory for existing personal computer systems. This device is a user definable, keyboard MACRO storage device which operates independently of the hardware and software installed in the computer, plugs into the keyboard line of the computer and stores a plurality of different keyboard MACROs, that is, keyboard keystroke sequences. internally, the device contains a dedicated microprocessor which monitors and controls all operations. It stores the MACROs, selected by the user, in its non-volatile memory and associates them with user-defined commands. The commands are then subsequently executed via the device's keypad. The invention may be installed permanently in the keyboard line without taking any precautions to save the MACROs when the computer is powered down or, in the alternative, when the device is removed from the keyboard line. The device performs detailed internal self checks in order to insure its correct operation. The device is compatible with all computer programs, needs no support softwave or hardware in the (main) computer system; and, no RAM space, expansion slots or ports are used.

6 Claims, 8 Drawing Sheets

HEXADECIMAL PROGRAM LIST

FIG. 6

SOFTWARE AND HARDWARE INDEPENDENT AUXILIARY USER PROGRAMMABLE INTELLIGENT KEYBOARD

This is a continuation of co-pending application Ser. No. 07/047,695 filed on May 8, 1987, now abandoned.

Field of the Invention

This invention relates to low-cost computer peripheral devices of the input type and, more particularly, to a user-programmable, computer keyboard input entry device.

Background and Objects of the Invention

Often, people encounter difficulty and confusion when using a computer. One frequently encountered, confusing aspect of inputting information through a keyboard to the computer is that the user must memorize particular sets of keyboard strokes which must be typed in order to operate the applications software This is analogous to learning a foreign language Most people find it to be a tedious and time consuming process. Because of the likelihood of error, as well as the tedium, many computer users never master the useful operation of a computer, particularly in a business office environment Such a consequence, of course, becomes extremely costly since a significant number of computer users never learn the required keyboard commands or they learn a few of the fundamental sequences and individual commands and thus waste a portion of every software applications program. Thus, there is a need for devices which will make computers more "user friendly", i .e ., reduce user learning time, as well as errors.

Definitions

Certain terms shall be used throughout this disclosure, and are given the following definitions:

MACRO is defined as a keystroke function which represents or emulates a keyboard keystroke set or data set and is used to replace certain keyboard keystroke or data sets.

KEYBOARD COMMAND (KC) is a sequence of specific keystrokes that a computer user must enter at the keyboard in order to initiate an operation in, or elicit a specific response from, the computer system.

SEQUENCE (of keyboard keystrokes) is any series of keyboard keys that are struck by the computer user . The sequence of keyboard keystrokes might be a KC, some user defined data, or any random sequence of keystrokes entered by the computer user.

PROTOCOL is a planned method for accomplishing a common task between two computers or computer devices.

KB PROTOCOL (keyboard protocol) is a defined set of mechanical connections, electrical connections, computer control signal formats, and the data transmission format between a keyboard unit and a computer systems unit. Thus, it expresses mechanical activities and electrical functions that are employed in transferring user keyboard outputs to the computer operating system.

KB CODE is the unique set of bits which define the scan code for a given keyboard key. When data are sent to the computer systems unit, they are in the form which incorporates the KB CODES (keyboard scan codes) . A KB PROTOCOL typically combines some or all bits that comprise a start bit, a stop bit and parity bit with the KB CODE to form a total data transmission FORMAT as transmitted by the keyboard to the computer systems unit.

FORMAT (the keyboard data transmission form) means the combination of system bits, such as the start bit, stop bit or parity bit, and KB CODES which represents the condition of a unique key on the keyboard and which is transmitted to the computer system when the computer user presses or releases a keyboard key (i.e, strikes a key).

STRIKE/STRIKING a key means, as in normal typing, pressing and immediately releasing a key. This activity is an electrical contacting and breaking action.

SIMILARITY and FAMILY. Computers are generally described as finite-state automata or, simply "machines". Two or more separate machines are defined as being SIMILAR if they employ the same KB PROTOCOL and the same KB CODES. However, if these machines employ the same PROTOCOL but have different KB CODES, they are said to be dissimilar but within the same FAMILY (of machines).

NON-VOLATILE MEMORY is memory means which retains its internally stored data when all external electrical power is removed . The internally stored data become available for normal use when the external electrical power is restored.

HARDWARE INDEPENDENCE . When an ancillary machine is capable of performing its required tasks, regardless of the characteristics of the equipment to which it is connected, it is known as possessing HARDWARE INDEPENDENCE.

SOFTWARE INDEPENDENCE is the ability of an ancillary machine to perform a desired task, regardless of the operating system software or applications software being used in the host computer, and without the need to install any additional software in the computer system.

TRANSPARENCY . An ancillary machine or device is TRANSPARENT to the operation of a computer system if it can be installed and used on the computer system without requiring any additional installation or modification of computer hardware, or any additional installation or modification of computer software, and if the computer can be operated normally in all modes of operation should the user choose to ignore the presence of the ancillary device.

CONCATENATED STORAGE is a method of filling memory storage space whereby information is abutted or chained together with no Wasteful breaks or spaces between information statements.

Prior Art

Specially preprinted keyboard keycaps or keyboard overlays (templates) are available for specific application software programs . These are factory preprinted, with a specific function to be performed by a given key on the keyboard. There are disadvantages to this approach. With a continuing trend to decrease size and enhance (clean up) the appearance of all equipment, there is limited physical space available for printing legible messages on the tops of keys or in the area around the keys. Consequently, it is difficult to present a clearly written instruction on a command statement that involves striking a sequence of keystrokes. Also, the messages are preprinted at a factory. This means that the user does not have the freedom to decide which keyboard command statements are important in his/her application. This gives the keyboard "overlay/template" approach limited utility.

A hardware and software approach to making a computer more user-friendly is to use specially constructed software along with keyboard peculiar hardware input devices. Such devices, sensitive to physical and locational parameters are moved about the keyboard or other references and, because of their design and movability, are colloquially called "mouse" input devices. A "mouse" can be used to move a video display cursor in order to point out and select a desired computer operation. The "mouse" approach can only be used with software programs that are written to support it. Thus, the use of a "mouse" is not possible with the majority of existing software applications programs. This seriously limits the utility of the "mouse" approach.

Other hardware and software approaches to making a computer more user-friendly are "touch screens" or "light pens," along with special operating software; a variation of the "mouse" technique. The user can touch a desired area of the video display screen with his finger (touch screen) or with a light sensing pen (light pen) and thereby activate a software-driven label on the video display that tells the user what computer function will be initiated by making that choice. These approaches lack general utility because they require that special hardware and software be employed, as with "mouse" devices.

A purely software approach is to use cleverly designed scrolling menus, pull down menus, paging menus, or help screens; all of which appear on the video display. While helpful, all of these techniques are specific to a particular piece of software Thus, they lack the general utility and personal flexibility for the computer user.

Because of the aforementioned inability of the common user to master, or simply remember, the myriad keyboard input strokes and combinations of keyboard strokes, significant attempts have been made to relieve their difficulties. One such attempt, which has been quite successful, is to provide keyboard enhancement programs (KEP's). The KEP is a software program which is loaded into the random access memory (RAM) of a computer. The KEP has a significant feature in that it has the ability to retain and repeat, on command, user-defined sequences of keyboard keystrokes and to define one or more of the regular keyboard keys as a MACRO key, which can be struck to recall the storage keystroke sequence when needed. However, KEP's contain several disadvantages for the average computer user. One problem is that KEP's are not compatible with all software programs; that is, the KEP software program and the application software program can sometimes compete for the same memory locations in the RAM. Another disadvantage is that the KEP uses a key on the existing computer keyboard to act as a MACRO key to input a storage keyboard sequence There may not be enough unused keys on the keyboard to accommodate all of the keystroke sequences that a user wants to store, and later recall. It is also inconvenient to affix a plurality of user labels to a standard keyboard Finally, since the KEP exists in the RAM memory of the computer system unit, the stored sequences (MACRO's) are not permanently stored They are essentially stored in VOLATILE memory and disappear when the computer power is turned off. Such data could be saved by storing it on a floppy diskette, for reloading to the computer at a future date; but this represents an additional diskette operation for the user to physically perform.

Add-on hardware which connects into the keyboard cable line of the computer includes units made by Genest Technologies Inc., Santa Ana, California and Touchstone Technologies, Rochester, NY Such hardware is factory programed to output specific KB CODES to the computer when the user presses a specific control key on the device. Such devices are used for cursor or screen control, or as numeric data entry keypads. They are not designed to record and reproduce a user's selection of keyboard keystrokes. A desirable facility would be recordation and reproduction of a user's selection of keyboard strokes, i.e., user programability.

Similar devices, which plug into the keyboard cable line of the computer, contain an internal, electrically programmable read only memory (EPROM) device which stores factory programed sets of keystroke sequences. Such devices, characterized as ROM-based MACRO statement generators, output the programed set of keystroke sequences to the computer unit whenever the user strikes a particular control key on the device. The user has no ability to program and store his/her own unique keyboard sequences.

Systems which directly address the computer hardware through an adaptor input-output (I/O) card, that is inserted into the internal system, can be properly said to be MACRO-producing systems. They additionally require a special software program to be installed in the host computer system. The user can then program his/her own MACRO statements into these units. Similarly, many data acquisition systems involve the use of expansion cards which the user must install in the computer, in addition to installing specialized support software. However, none of these units are easy to install since the user must have a special interface card resident in the computer system; and they require that a special software program be loaded into the computer's RAM. Thus, these devices can be incompatible with some applications software, if that software competes for the same RAM locations as the MACRO-generating software or data acquisition software. This produces the same limitations as those encountered by KEP's, discussed above. This limitation, plus the fact that the user must manipulate both hardware cards and software diskettes, is disadvantageous to the average user.

Other add-on hardware/software systems are available in the art. These systems may be used to control positioning of the cursor as well as provide MACRO keys that may be programmed by the user. They are inserted into the keyboard line of the computer system and thus they are HARDWARE INDEPENDENT of the computer system However, the user must install a special applications program into the computer in order to define MACROs. Such systems however, are not SOFTWARE INDEPENDENT and greedily compete for RAM space with other software programs. Essentially, they also have the same disadvantages encountered by the use of KEP's; notably, the MACRO storage is volatile and the information must be saved on a floppy diskette.

Recently, expanded-function keyboard units have been introduced that have the ability to record and store user-defined keyboard keystroke sequences. These devices are installed as total replacements for the original keyboard that was supplied with the computer The "Smartline Smart Board" from Wico Corporation, Niles, IL can store user-defined keyboard keystroke sequences on any of the ten function keys. The MACROs are stored in a battery backed-up RAM circuit. An inherent weakness of this approach is that a user must replace the entire keyboard of his/her computer to gain the function of MACRO storage at considerable expense. Additionally, it is not always possible to clearly label the MACRO contained on each of the ten function keys, since some applications programs already have labels which attach to these keys. Also, the user must activate a switch to change the action of the function keys to MACRO keys, and conversely. Finally, the device must be programed without any visual feedback or prompting from the computer display screen; thus, another confusion factor has been injected into the use routines and the common user has gained little in true simplification and "user friendliness."

Similar to the above, is a replacement keyboard system which dedicates a "touchpad" section of the keyboard for the storage of user-defined keystroke sequences. Such a system totally replaces the original keyboard of the computer system and retains a significant weakness in that the replacement keyboard has no internal user-alterable memory means. Instead, it requires the use of KEP-type software which must be loaded into the computer's RAM. Thus, this system requires that the user save any stored information on a floppy diskette, to be reloaded whenever computer power is restored. The lack of compatibility with all user software, the need to save MACRO's to diskette, and the need to replace the entire keyboard limit the utility of this approach. More importantly, the replacement keyboard can only be used for SIMILAR COMPUTERS (that employ the same KB PROTOCOL and the same KB CODES), because it also functions as the regular keyboard input for the computer Thus, this class of keyboards must be designed to produce the KB CODES specific to a computer and cannot be used on a broader FAMILY of computers which has different KB CODES, retaining only the same KB PROTOCOL. This means that any keyboard is not generally transportable nor interchangable between different types of computers. This HARDWARE DEPENDENCE is another disadvantage of such systems.

It is therefore the primary object of this invention to provide a User Programmable Keyboard Entry Device (hereinafter, UPKED) which is a piece of ancillary or peripheral equipment, i.e., a machine, that can be user-programed and used to input data of either a user-defined keyboard keystroke sequence or other (externally) acquired data into the user's computer system.

It is a concomitant object of the invention to provide an UPKED data input means for inserting data, that have been acquired from external sources, into the computer through the keyboard line.

Another object of the invention is to provide an UPKED machine which is user installable and which may be installed without tools or special training.

Yet another object of the invention is to provide an UPKED machine that is SOFTWARE INDEPENDENT.

Another object of the invention is to provide an UPKED machine which will not alter nor interfere with the normal hardware or software operation of the computer system.

The goal of this invention is to record and reproduce, for computer input on user command, user-generated sequences of keyboard keystrokes or other data for computer input, whether the data are generated by the user at the keyboard or acquired from some source external to the computer system. Consistent with this goal is the object to produce a machine which comprises an external, add-on device on which the user can easily define MACRO keys of his/her own meaning.

It is still another object of the invention to provide an UPKED machine that can be used with a plurality of different keyboards within a FAMILY of computers.

Other definitions, shortcomings of prior art and objects of the invention shall become apparent by the disclosure hereinafter made, as will the advantages thereto.

Summary of the Invention

The User Programmable Keyboard Entry Device (UPKED) is a stand-alone hardware device which is placed in the keyboard-to-processor line of a computer. The device can be installed by any competent computer user; no special tools or knowledge are required. UPKED contains a plurality of control or MACRO keys. Each of these keys energizes circuitry that is capable of storing any combination of keyboard keystrokes made by the computer user. Thus, the device functions as an external, user programmable memory device with user definable MACRO keying. The user can input to the computer the equivalent of any combination of keyboard keystrokes simply by striking (pressing and releasing) one of the user-defined and user-labeled MACRO keys on the device. The user can reprogram any of the MACRO keys at any time to represent a new sequence of keyboard keystrokes. This is accomplished through non-volatile RAM circuitry resident in the device.

The invention is used to accelerate the learning and mastery of complicated computer software applications programs. The user can store necessary repetitive keyboard SEQUENCES on the corresponding MACRO keys of the subject invention. The user can affix an unambiguous label to each MACRO key. Thus, the desired command may be input to the computer system unit simply by locating and striking the appropriate MACRO key. Such a facility eliminates the need to memorize or continuously research complicated, and somewhat arcane, keyboard SEQUENCES before a user becomes proficient at using an applications program.

In the preferred embodiment of the invention, input data are stored in selected MACRO key-addressable locations, selected for input by striking those particular MACRO keys (or collected from external sources) and, subsequently, input to the computer system through the keyboard line.

The operation of the invention does not depend on support from the hardware or software of the host computer system and its operation does not require the installation of special software in the host computer system. Thus, it is TRANSPARENT to the operation of the computer system and is portable between SIMILAR computer systems.

When one of the MACRO keys (i.e., control keys) of the invention is struck by the user, the user-stored keyboard SEQUENCE represented by that key, or the data which is accessed by that key, is input to the computer. Since most software applications programs are operated by having the computer user repetitively input predefined sets of keyboard keystrokes, i.e., keyboard statements or keyboard commands (KC's), the user can be much more efficient in learning and operating the program if the commonly used KC statements are stored as corresponding MACRO keys on the UPKED. The user can recall any of the stored sets of keyboard SEQUENCES (or other data) simply by pressing one of the MACRO keys on the UPKED. Each MACRO key can bear a large, legible, user-provided label which clearly identifies the content of that MACRO. Because of user reprogramability, the content of any MACRO key may be changed as often as desired; the memory means of the subject invention being non-volatile and therefore permanent, until it is deliberately changed by the user. Operation of the subject invention is designed to be independent of the 8-bit KB CODES generated by the computer keyboard. Thus, it may be used with a plurality of different keyboards and within a FAMILY of computers. Since the invention is independent of the keyboard data coding, independent of the computer software being used, and independent of the computer hardware being used (save for the KEYBOARD PROTOCOL and the computer's 5-volt power supply), it is physically transportable between a plurality of different computer types.

Great utility is inherent in the invention in that it may be also applied as a user preprogramed replacement for a conventional keyboard in applications where only a predetermined, fixed set of commands are to be entered into a computer, for example, in machine tool or in robot control applications.

The invention is used to independently program or alter the operation of a computer in as much as programming routines can be stored on each MACRO key and input to the computer whenever the appropriate MACRO is struck. Input data derived from the sources other than the keyboard may also be applied to the computer in that such data may be stored or made available on any of the MACRO keys and thereafter input commanded by the computer operator. The invention is, in certain versions, used with interface circuitry capable of performing analog-to-digital conversion and thus provides a digital input interface enabling the acquisition of both analog and digital data from external sources. The externally acquired data are input to the computer system under the control of the MACRO keys in the same fashion as are keyboard data.

Brief Description of the Drawings

Of the Drawings

FIG. 6 is an hexadecimal listing of the microprocessor operating system.

Detailed Description of the Preferred Embodiment

Figure 1A:
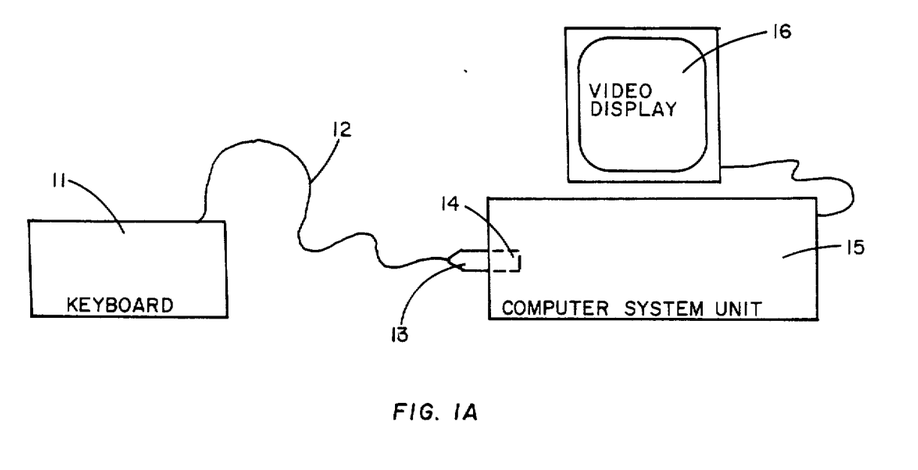
FIG. 1A illustrates a computer system before the invention is installed.
Figure 1B:
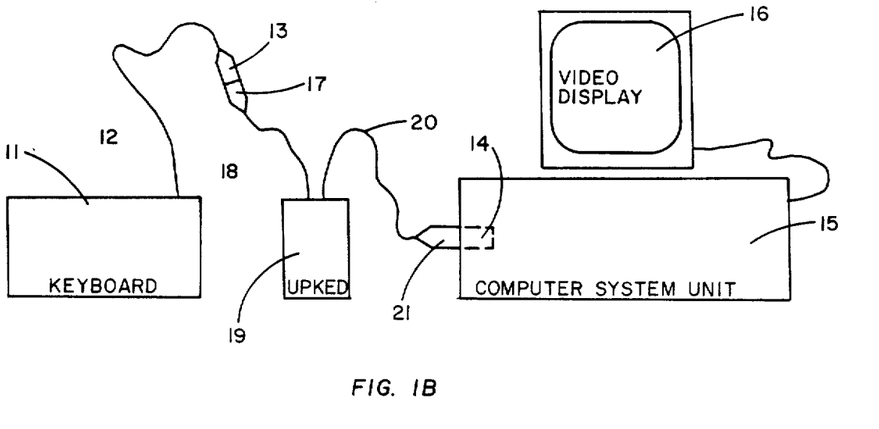
FIG. 1B illustrates a computer system with the invention installed.
Figure 1C:
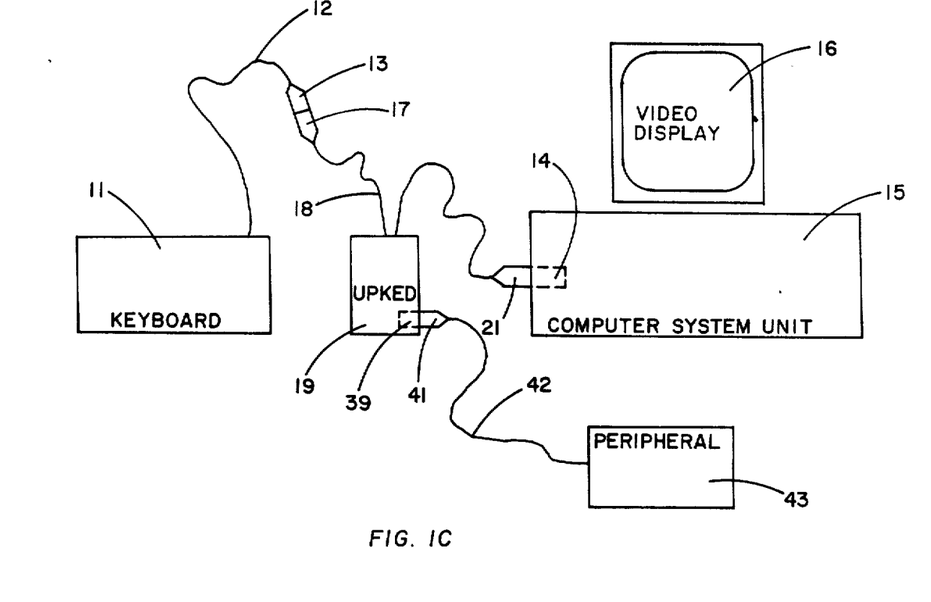
FIG. 1C illustrates the invention installed and also utilizing data acquisition feature.

FIG. 1 shows the method of installation of the User Programmable Keyboard Entry Device (UPKED). FIG. 1A shows a typical computer installation consisting of keyboard 11, keyboard data line 12, keyboard plug 13, keyboard input jack 14 on the computer system, computer system unit 15, and video display unit 16. FIG. 1B illustrates how the UPKED 19 is typically installed. The keyboard plug 13 connects into the input jack 17 which is connected to the input line 18 of the UPKED. The output line 20 of the UPKED has an output plug 21 which inserts into the keyboard input jack 14 of the computer systems unit. FIG. 1C shows the installation of an UPKED which is equipped for the input of externally acquired data to the computer through the computer's keyboard line. The electrical transmission lines 42, from the external system 43, terminate in a plug 41 which mates with a data input jack 39 on the UPKED. No other electrical connections or mechanical or software installation steps are required. Thus, the UPKED can be installed without the use of tools, by practically any user.

Figure 2:
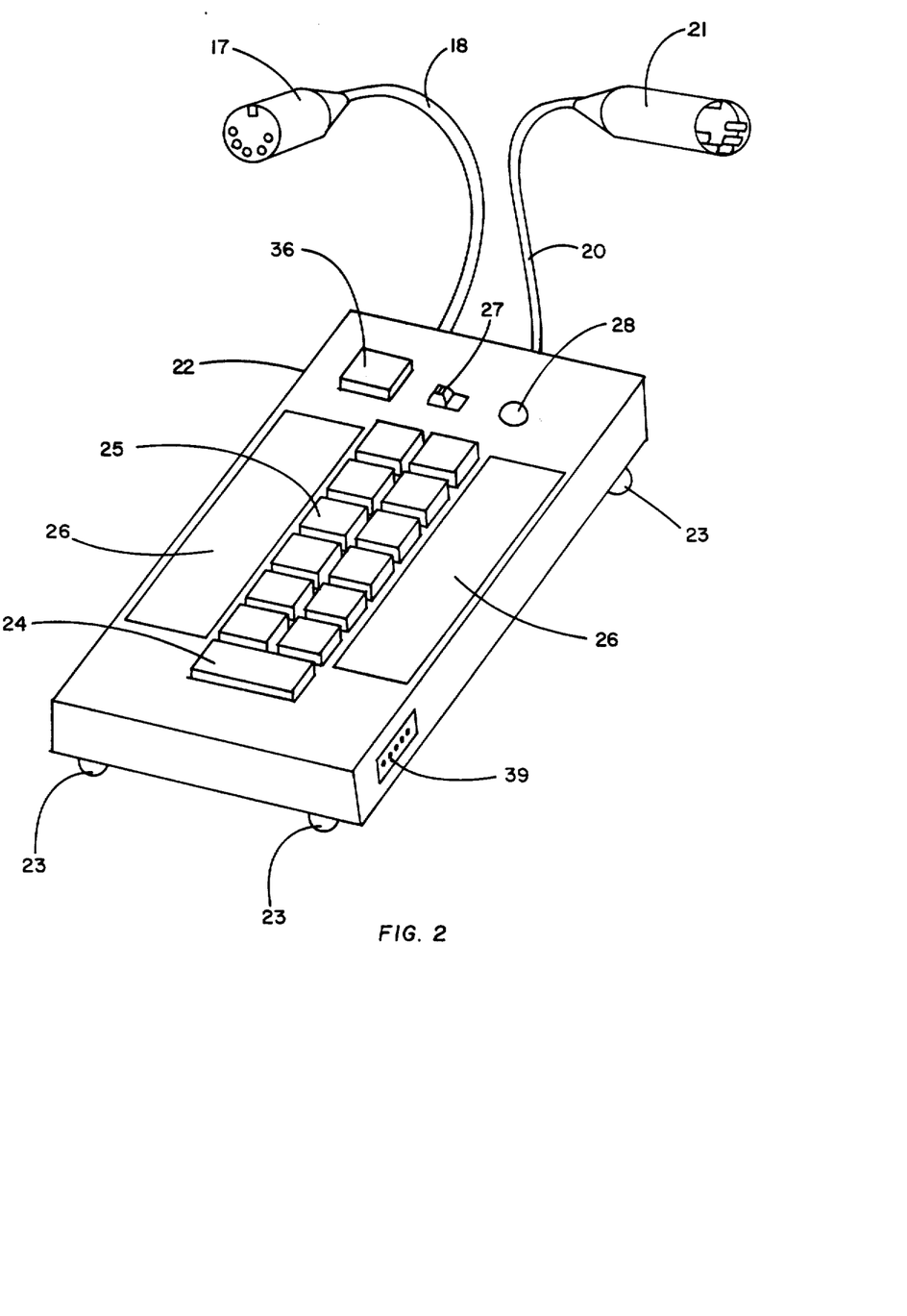
FIG. 2 is an isometric view of the invention.

FIG. 2 is an isometric illustration of an UPKED. The body of the UPKED consists of a plastic and metal case 22 which is suitably designed to be used on a desk top in an office environment. The user can place the case 22 at any convenient location near the regular keyboard. Elastomer footpads 23 keep the UPKED from sliding on the desk top. The keyboard plugs into the jack 17. The UPKED plugs into the computer system unit through the output plug 21. The UPKED contains a plurality of user controls, or MACRO keys 25 and may contain a shift key 24 or programming time delay key 36. The function of the shift key 24 is to enable the storing of two different keystroke sequences on each MACRO key: the first if just the MACRO key alone is struck and the second if the same MACRO key is struck while the shift key is depressed and held down. The function of the optional programming time delay key 36 is to enable the user to insert time pauses into the output data stream of the UPKED when needed. The user can write and attach his/her own clearly written labels 26 next to each column of MACRO keys. The labels unambiguously indicate the function performed by each MACRO key. The two-position "RUN/PROGRAM" switch 27 is used to control whether the UPKED is operating in the normal run mode or program mode. "RUN" selection inputs data to the computer system unit when a MACRO key is pressed; in the "PROGRAM" mode, the user is enabled to store a new keyboard keystroke sequence or other data on any selected MACRO key. To program any selected MACRO key, the user moves the "RUN/PROGRAM" switch 27 to the "PROGRAM" position. He/she then strikes the MACRO key 25 which is to be programed and, on the regular keyboard, types out the keyboard keystroke sequence (hereinafter, a MACRO statement) in a normal manner. As the MACRO statement is being typed, the UPKED both records the data in its non-volatile memory and simultaneously outputs the keyboard keystroke sequence to the computer system unit. Note that this produces normal and natural feedback to the computer user since, as the sequence is typed, the computer system responds in the normal manner. Simultaneously, the keyboard keystroke data codes for that particular MACRO are also stored in the non-volatile memory of the UPKED at a location which is addressed by the MACRO key that has been selected by the user. After typing out the keystroke sequence, the user then moves the run/program switch 27 back to the "RUN" position. The MACRO statement is now permanently stored at the memory location addressed by that MACRO key. The UPKED will output that stored keystroke sequence to the computer system unit whenever the user strikes that specific MACRO key on the UPKED.

The computer system unit cannot distinguish whether the received sequence of data code pulses is being generated by the keyboard or the UPKED. This makes the UPKED transparent to the hardware as well as the software of the computer system being used. Since the memory means of the UPKED is non-volatile, the stored MACRO statement or acquired data are available for the user's input to the computer at any time in the future. Furthermore, the computer system can be turned off without affecting (partially or fully volatilizing) the MACRO statement storage. Accordingly, the UPKED can be disconnected from the computer system and reconnected at a future date to the same, or a SIMILAR, computer system without affecting the integrity of the stored MACRO statement. The user can reprogram any of the MACRO keys by simply repeating the above process and typing in a new MACRO statement at the keyboard. The UPKED will simply erase the old MACRO statement at the selected MACRO key 25 and replace it with the new keystroke SEQUENCE as it is being typed at the keyboard. The embodiment of the UPKED described herein is designed to record all keyboard codes that appear with eight data bits. Thus, the UPKED can be used within a FAMILY of computer systems that have different keyboard coding schemes. The UPKED operates without direct support from the hardware of the computer systems unit 15 and keyboard 11, independently of the software of the computer system, and independently of the keyboard code convention of the computer system as long as it is an 8-bit (data) word system. The UPKED is thus transportable between a plurality of computers in the same FAMILY. The internal operating system of the UPKED is reprogramable in order to accommodate other than 8-bit keyboard codes. Those skilled in the art will realize that the internal operating system of the UPKED can be designed to universally accommodate any arbitrary keyboard character pulse coding scheme. The selection of an 8-bit coding system described herein is merely for convenience, because a majority of existing computer systems use 8-bit keyboard data codes. The plugs 21 and jacks 17 must physically mate with the different possible computer systems, i.e. having the proper protocols. When necessary, this is addressed by using simple plug and jack conversion adapters.

Figure 3:
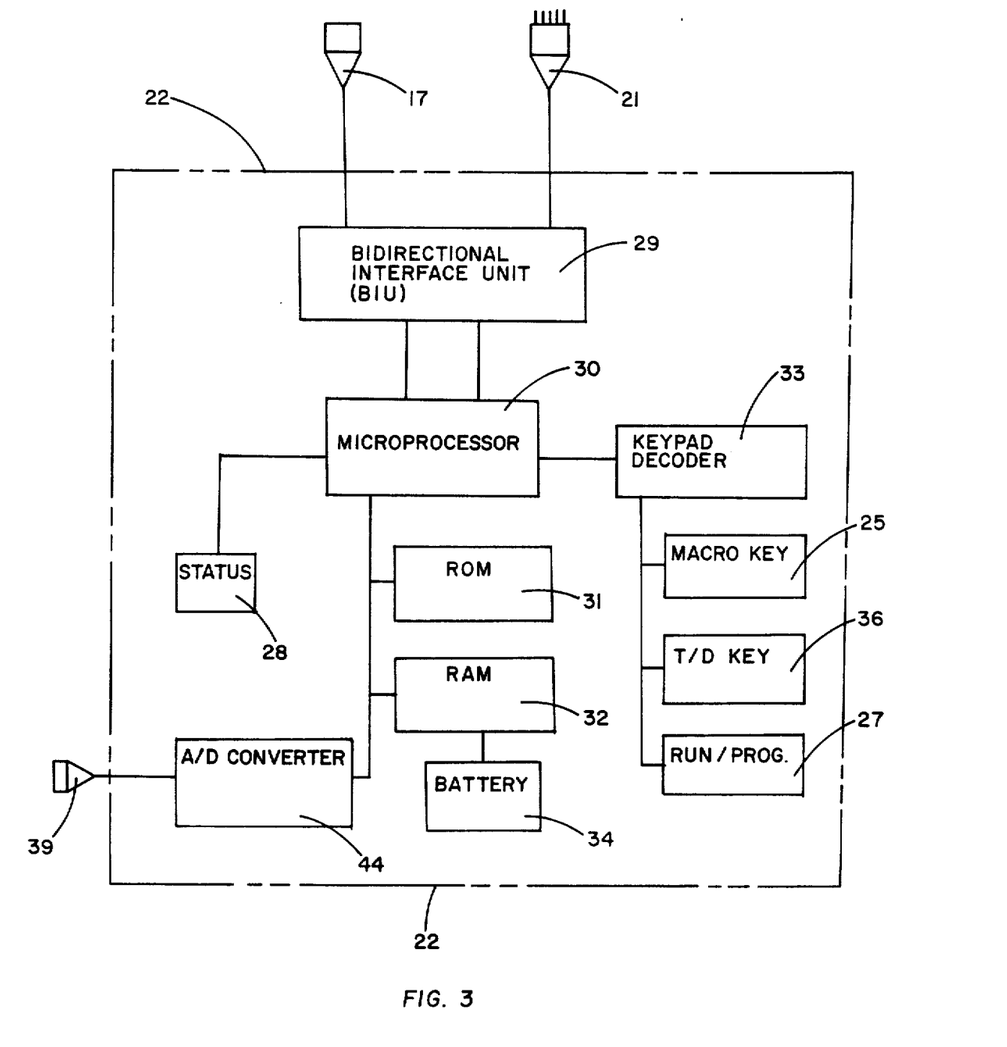
FIG. 3 is an electrical block diagram of the preferred embodiment of the invention.

FIG. 3 is an electrical block diagram of the preferred embodiment for UPKED. There are many different ways of constructing an UPKED. The inventors herein describe one embodiment; but do not exclude other approaches that differ in detail, rather than in functionality. The keyboard jack 17 mates to the output plug of the keyboard. UPKED output plug 21 mates with the keyboard input jack 14 of the computer systems unit. External data acquisition signal input jack 39 and case 22 are indicated diagrammatically. The keyboard and computer system unit communicate with each other through the circuitry of the bidirectional interface unit 29. The function of the bidirectional interface unit (BIU) 29 is to electrically isolate the rest of the UPKED circuitry from the normal operation of the keyboard line. The BIU only inputs electrical signals to the rest of the UPKED circuitry when data are being purposely furnished to the UPKED The BIU only transmits the output of the UPKED circuitry (to the computer systems unit 15) when a stored MACRO statement is elicited for transmission to the computer by striking a MACRO key 25. The BIU 29 also functions to decouple the normal flow of bidirectional communication (between the keyboard 11 and computer systems unit 15) from the rest of the UPKED circuitry. This feature assures that the majority of possible failure modes that can be suffered by the remaining UPKED circuitry will not reflect to, nor interfere with, the normal operation of the computer system. Finally, the transistor-transistor logic (TTL) BIU circuitry is more resistant to random electrostatic discharge damage than is the metal-oxide semiconductor (MOS) circuitry of the microprocessor or memory chips that are used in the internal circuitry of the UPKED. For example, the presence of the BIU makes the UPKED more resistant to damage by random electrostatic discharges of the type often exhibited by people-machine contacts.

It should be noted that a typical keyboard cable in a computer system consists of the following electrical circuits: data, clock, reset (R), supply power (Vcc), system ground, and electrostatic shield. Unless otherwise indicated, off-the-shelf components are employed throughout the preferred embodiment. This allows very cost-effective attainment of the invention's objects and the overall goal.

The microprocessor 30 is used to control the operation of the UPKED. The internal operating software system for the UPKED is contained in the ROM 31. The 8 bit data code information contained in each keyboard data transmission format is stored in the RAM 32. This RAM is typically a low power static RAM which requires a very low standby current to retain its data. Thus, a long-life lithium thionyl chloride back-up battery 34 can supply enough current to permit the RAM 32 to retain the stored information for many years, independent of whether the computer system is providing any supply power (Vcc).

The ROM 31 and RAM 32, with battery 34, make the operation of the UPKED totally independent of the software programs which may be resident in the computer 15. This makes the UPKED compatible with all computer software.

Any or all of the microprocessor 30, ROM 31, and RAM 32 can be combined into a single integrated circuit known in the industry as a microcontroller. The internal battery back up 34 makes it possible to disconnect the UPKED from one computer system and install it on another system without loss of data. Those familiar with the art will recognize that the low powered RAM 32 and back-up battery 34 are readily replaceable by a non-volatile, electrically alterable ROM IC, such as an EEPROM or a NOVRAM. The BIU 29 helps to protect the internal MOS circuitry from disruption by random electric currents and electrostatic discharges while the UPKED is in use or being transported from system to system.

The keypad decoder 33 is a standard integrated circuit that enables the microprocessor to determine which of the keypad keys have been depressed by the user. Computer technicians could eliminate IC 33 by modification of UPKED circuitry and the internal operating system, so that the microprocessor 30 directly monitors the keypad 25. The keypad is an array of switches. The greater the number of individual switches in the keypad, the greater the number of individual sets of keyboard keystroke sequences that can be stored in the UPKED. FIG. 2 shows the presence of a shift key 24 in the preferred embodiment. The function of the shift key 24 is to enable the storage of two different keyboard keystroke sequences on each of the other MACRO keys 25. The user can strike any MACRO key and transmit the information stored there into the computer system unit. If the user holds down the shift key 24 while striking the same MACRO key, a different set of stored information is input to the computer. The shift key thus doubles the number of stored sets of keyboard MACRO's. Other extension of the keypad 25 are possible. For instance, the shift key can be replaced by a multiposition switch. The UPKED can then be operated in a "page" mode. That is, each position of the multiposition switch defines a page of MACRO key meanings. The "RUN/PROGRAM" switch 27 is wired into the keypad circuitry and is also decoded by the keypad decoder 33. The user programmable time delay switch 36 is also wired into the keypad decoder circuitry.

The output of the UPKED simulates the output of a conventional keyboard. The characters that are output by a conventional keyboard are transmitted at a very slow rate, which is basically the manual typing speed of the computer user. Many software programs utilize a "type-ahead" buffer in the computer system. The purpose of the type-ahead buffer is to allow a fast typist to input characters to the computer faster than the software program is able to use them. When the typist pauses, the software program and computer can catch up. The operating system for the UPKED is designed to transmit the characters in a stored MACRO statement to the computer at a slow rate that approximates a human typist. This reduces the possibility of the UPKED transmitting characters a rate which is faster than the operating receiving rate for the combination of computer and software being used. However, some software does not utilize a type-ahead buffer for the system. Other software may incorporate a type-ahead buffer, but the software may still be very slow. In these cases, the UPKED might transmit characters faster than the computer system can use them. In such a case, information is lost and malfunctions may result. If a computer user is confronted by such a situation, it is possible to insert time pauses into the string of characters being sent into the computer by the UPKED. This is done by the time delay switch 36. This switch is similar to one of the regular keypad switches of the UPKED. However, the internal software operating system for the UPKED (which is stored in the ROM 31) interprets the time delay switch 36 in a unique manner. During the "PROGRAM" mode for any MACRO key, a predetermined, fixed time delay code is inserted into the stored string of keystrokes each time the time delay switch is struck. For example, strike the time delay switch 36 once and a one second pause will be inserted onto the MACRO statement output at that point in the keyboard keystroke sequence. Strike it twice and a two second delay will be produced, etc. The ability to insert time delay codes into the stored MACRO statement enables the user to create pauses in UPKED output that will allow the computer and applications program time to "catch up", when needed. It is possible to replace the time delay switch 36 by a combination of keyboard keystrokes that the user types in during the "PROGRAM" mode. The internal operating system of the UPKED can be set up to respond to a certain predetermined set of keyboard keystrokes in the same way as though a time delay switch 36 had been actuated. For example, pressing and holding "CONTROL" and "ALTERNATE" on the computer keyboard, plus striking "Q," would insert a one second delay. Repeating this seven times would insert a seven second delay, etc. The weakness with this approach is that assigning UPKED control functions to special sets of keyboard keystrokes can possibly interfere with a software applications program that uses the same keystrokes for other functions. Using a dedicated time delay switch 36 on the UPKED avoids this problem. Non-linear time delays can also be programed into the internal operating system. For example, one actuation of the time delay key 36 could be used to produce a one-second output delay, two actuations a two-second delay, three producing four seconds, four producing eight seconds, etc.

The internal operating system of the UPKED is designed to run diagnostic tests of the UPKED every time the computer system is turned on. There are many different designs which may be proposed for a useful self test routine. The way used to perform a self test in the preferred embodiment is to compute the CHECK-SUM for all MACRO statements that are stored in the RAM 32. If any individual check-sum has changed from the last operation of the computer system, it is likely that one or more bits of information have been lost or degraded in the memory. Any check-sum failure prevents the status light 28 from lighting and the UPKED will automatically shut down its output of information, thus preventing erroneous information from reaching the computer system. An unlit status light 28 notifies the user that a malfunction has occurred. The UPKED is programed to cause a blinking status light 28 when the user has filled the available storage space in the RAM 32. The blinking light notifies the user that the UPKED memory is "full" and cannot store additional keyboard keystroke characters or other data. A steady "on" condition for the status light 28 tells the user that all UPKED systems are operational. The status light is disabled when the computer system is electrically or physically disconnected.

The amount of information which is stored by UPKED is determined by the size of its internal RAM 32 which is used. For example, many keyboards transmit two 8-bit keyboard DATA CODES per keystroke. The first code signifies "key down" and the second code signifies "key up". Thus, if the RAM 32 is a 2K×8 RAM, approximately one thousand (1,000) complete keystrokes can be stored. There are several different ways to partition the available number of keystroke characters stored among the plurality of MACRO keys 25. The usual way would be to divide the available storage capacity by the number of MACRO keys. For example, if 20 MACRO keys are used, then 1000/20=50, for a maximum MACRO statement length of 50 keystrokes. The internal operating system chosen for the preferred embodiment of the UPKED does not assign a fixed maximum number of characters to an individual MACRO statement. Rather, the operating system creates a RAM-stored address table for all of the stored MACROS. The MACRO statements are stored right next to each other in the storage space of the RAM memory 32. The address table keeps track of where each individual MACRO statement begins This method, hereinafter termed CONCATENATED storage, is preferred because no RAM capacity is wasted. Another advantage is that there is no maximum length for any single MACRO statement other than the total size of the RAM. The user can insert very long MACRO statements and very short MACRO statements into the UPKED. The only limitation is that the sum total of all of the MACRO statement characters stored not exceed the total capacity of the RAM 32.

Some computer systems are designed so that the computer systems unit 15 can transmit data and programs to the keyboard 11. In this case UPKED is equipped with an internal operating system that will enable the programming of the MACRO keys 25 by the computer systems unit 15, as well as by the computer user typing on the keyboard 11. The Bidirectional Interface Unit (BIU) 29 is modified to permit data input to the UPKED microprocessor 30 from either the keyboard or the computer systems unit 15.

The optional multi-channel analog-to-digital converter 44 with additional digital input capability enables the UPKED to acquire, process, store, and input non-keyboard generated data to the computer system unit 15 through the keyboard line. Such data are acquired from outside sources and presented at the data acquisition input jack 39. The processing, control, and timing of the data input to the computer system unit can be controlled by the function of the MACRO keys and the operating system (program) contained in the ROM 31.

Figure 4:
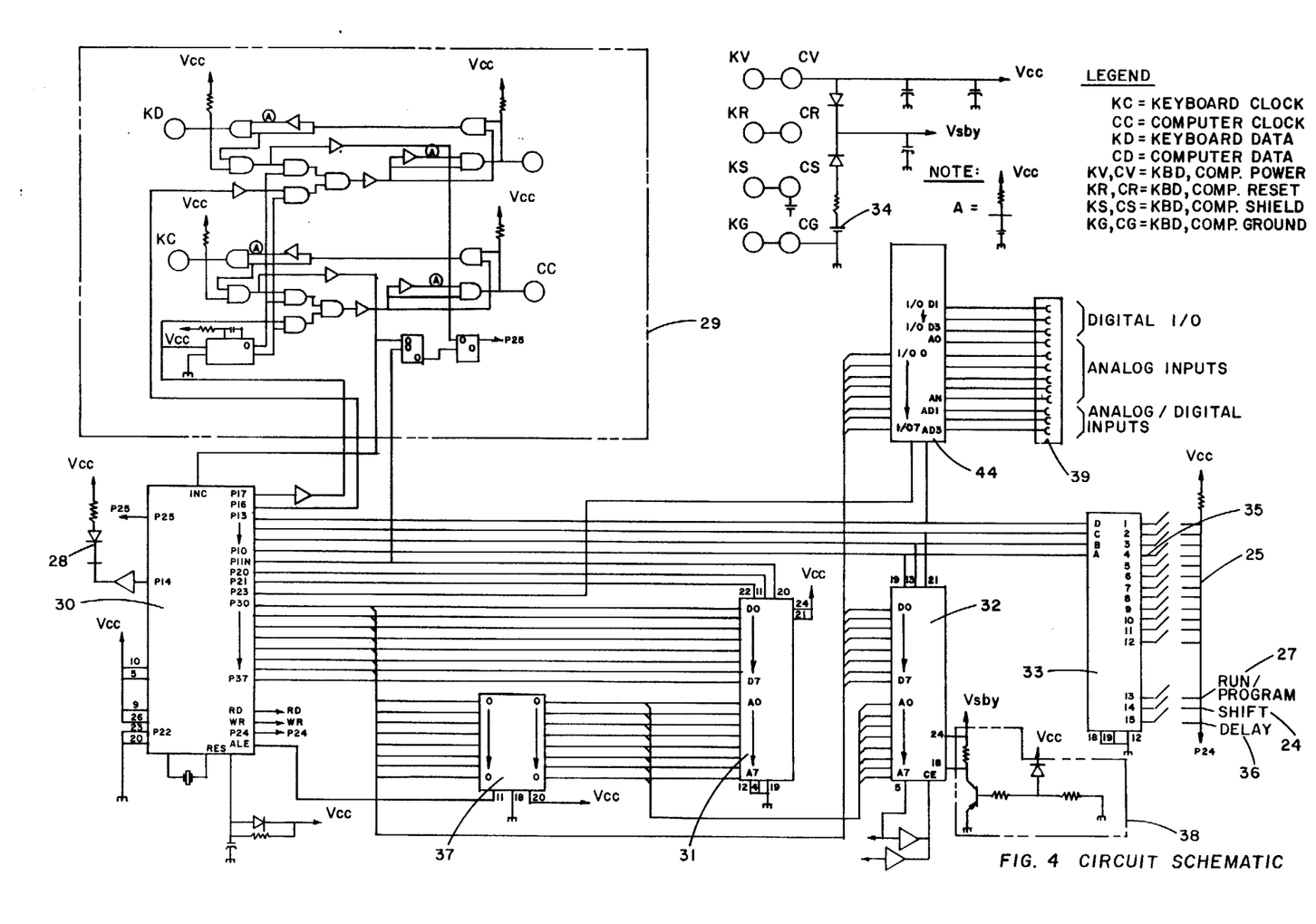
FIG. 4 is an electrical schematic of the preferred embodiment of the invention.

FIG. 4 is an electrical schematic for the preferred embodiment of the UPKED. The bidirectional interface unit (BIU) 29 is indicated within the dashed lines for clarity. The microprocessor 30, ROM 31, RAM 32, keypad decoder 33, keypad switches 25, shift key 24, time delay switch 36, run/program switch 27, status light 28, and battery 34 are indicated. Also indicated is an address-latch IC 37. An important feature is the system power down sequencing circuit 38. The purpose of this circuit is to disable the data input to the RAM when the supply voltage, Vcc, of the computer system falls to a predetermined minimum level, generally when the computer is turned off (powered down). The disabling of the RAM input prevents the RAM from recording any random characters (pseudo data) which might be transmitted by the microprocessor 30 as the supply voltage to the microprocessor, Vcc, decays toward zero volts. The circuit 38 is needed to prevent the corruption of the stored RAM data by these spurious microprocessor outputs during system power down. The multichannel analog-to-digital converter 44, with digital input capability, collects external data from signals presented at the external data input jack 39. Input lines for both digital and analog data are indicated schematically. The operating system for the UPKED can input the externally collected data to the computer system unit 15 either automatically or when the user strikes a MACRO key 25.

Figure 5A:
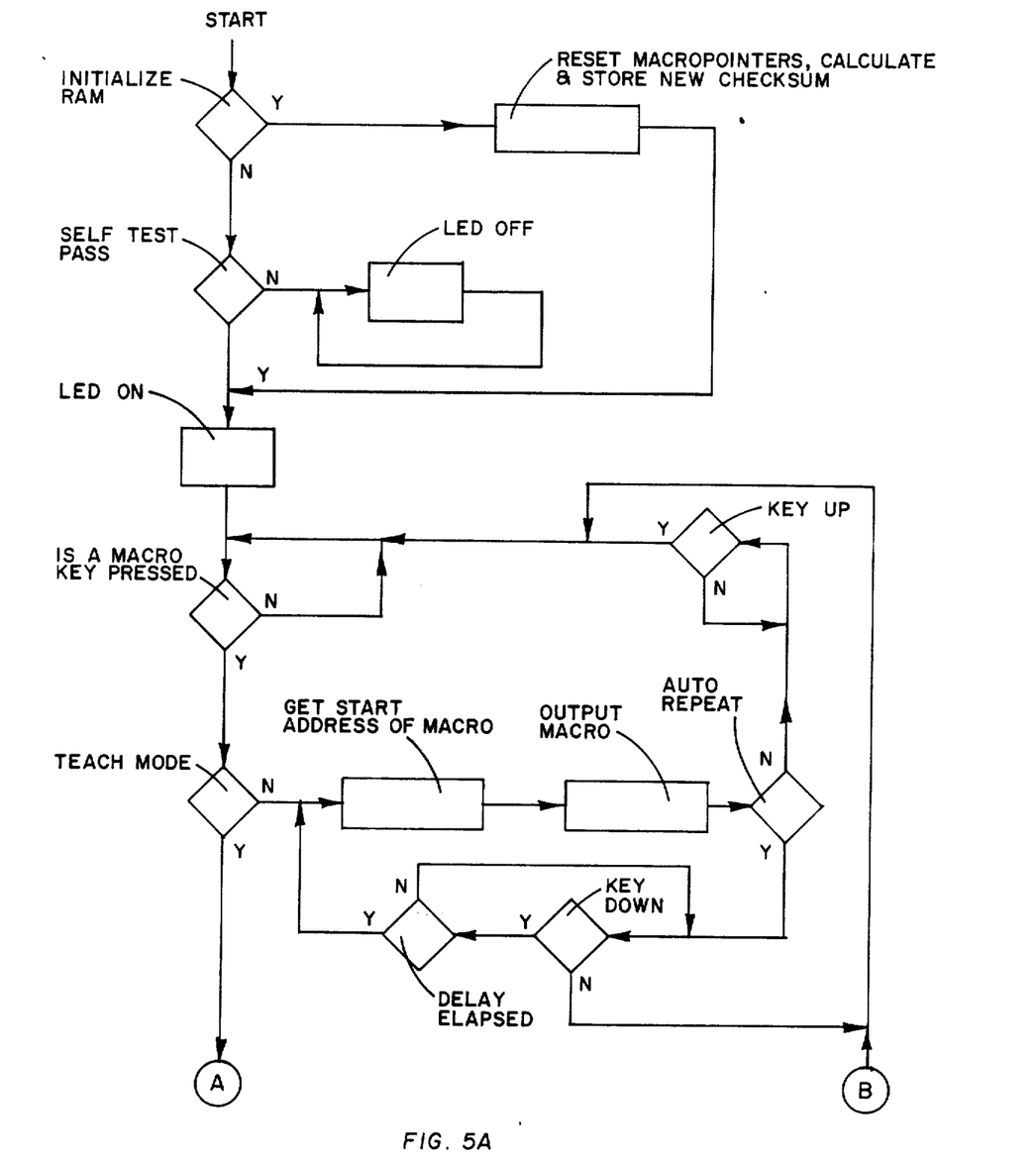
FIG. 5A and FIG. 5B constitute a program flow chart.
Figure 5B:
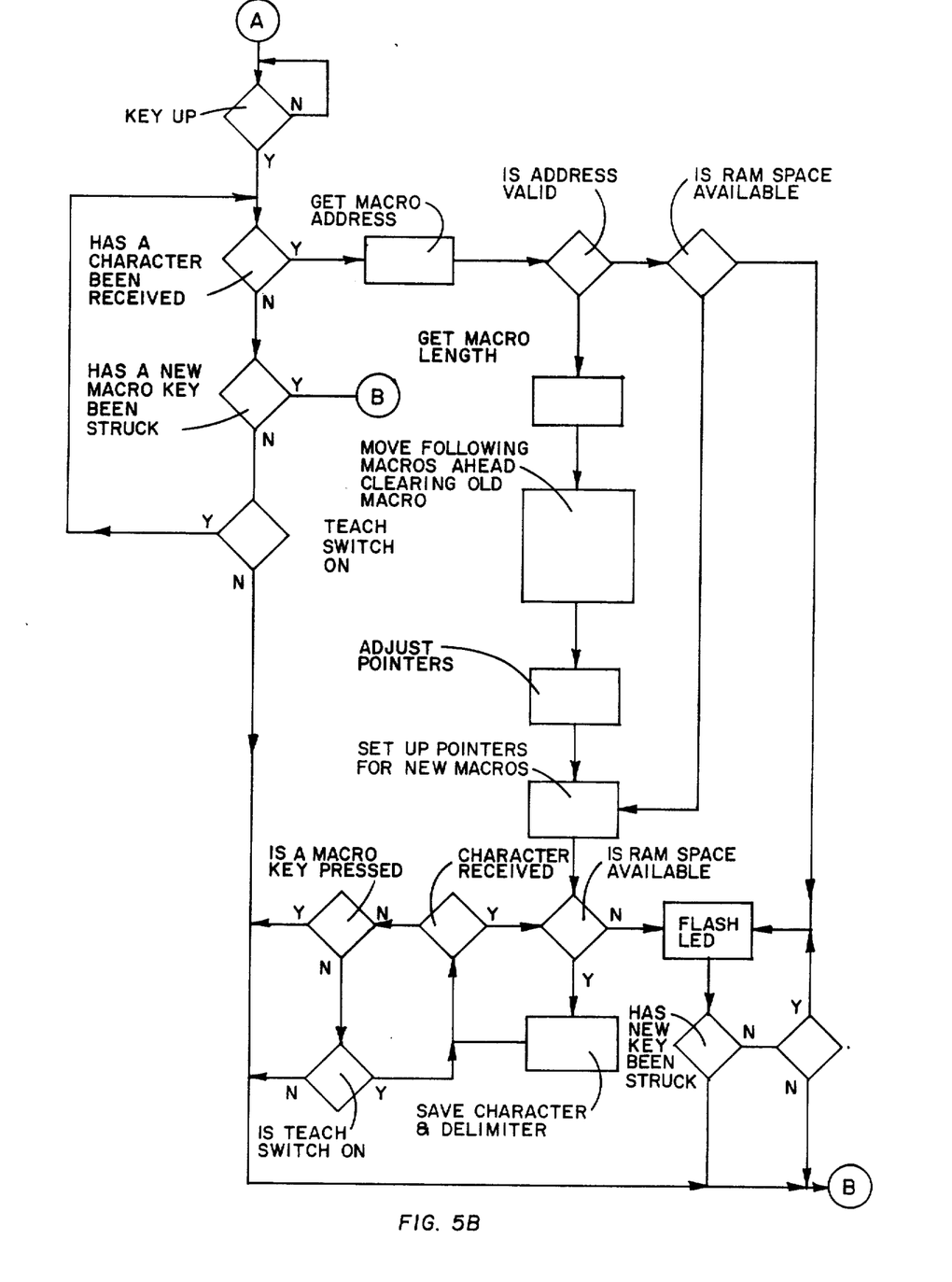

The program flow chart of FIG. 5 details the processes or methods that are used to operate the UPKED. Knowing the program flow and given a particular piece of hardware, here the INTEL 8035 Series Microprocessor, a typical computer programmer could easily write the executable object code for an UPKED.

Specific reference now being had to FIG. 6, there is illustrated a hexadecimal, executable implementation of the aforementioned program flow. This program appears as object code and may be readily rendered in source code (the more readily readable computer code) by performing either: (1) processing the subject hexadecimal code through a "disassembler" program for the 8035 series of microprocessor; or (2) translating the hexadecimal listing, code-by-code, using the "Instructions Set" information for the 8035 microprocessor contained in the INTEL CORPORATION handbook.

Further advantages of the instant invention shall become apparent upon use and practice with the invention. The diversity of application as well as numerous modes of operation may be readily seen to realize the objects of the invention, said usage being limited only by the appended claims.

What is claimed:

1. A portable and user-programable data storage and transfer device, for insertion and usage in-line between a computer data input subsystem and a computer processor system unit comprising:

microcontroller processing means for controlling said device, said processing means coupled to non-volatile memory means and interface circuitry;

the interface circuitry for coupling and decoupling said device to and from a computer keyboard in order to input data from said keyboard to said microcontroller processing means and also for sending data from said microcontroller processing means to the computer processor system unit while allowing unimpeded communication back and forth between said keyboard and the computer system unit;

non-volatile, user-alterable memory means for storing said data acquired from said keyboard, keying means independent of said keyboard and independent of said computer processor system unit, said keying means coupled to said microcontroller processing means and responsive to user selection and operation in order to store specific data acquired from said computer keyboard in said non-volatile memory means, to associate said stored data with a MACRO identifying label affixed to or near each key and to enable the user to command microcontroller processing means to output stored data from said non-volatile memory means to a portion of said interface circuitry for transmission to said computer processor system unit whenever the user operates said keying means.

2. The device of claim 1 wherein said interface circuitry further comprises a keyboard jack and bidirectional interface circuitry which transmits and receives data from said microcontroller processing means.

3. The device of claim 2 wherein said non-volatile memory means further comprises an EEProm, read only memory means.

4. The device of claim 2 wherein said keying means comprises a keypad with associated detection circuitry for allowing user key-control of said microcontroller processing means, said associated detection circuitry further comprising delay switching and program run switching means whereby transmission of characters by the device to the computer is paused to allow the output of the device to match the ability of the computer to receive the output without loss of output.

5. The device of claim 1 further comprising a battery for providing power to said microcontroller processing means in order to preserve memory when said device is decoupled from said computer system or otherwise subjected to computer power-down functions.

6. The device of claim 1 further comprising analog-to-digital conversion means coupled to said microcontroller processing means and said memory means for the purpose of acquiring non-keyboard input data in analog and utilizing it in digital form in the operation of said device.

* * * * *